US010948354B2

(12) United States Patent
Munir et al.

(10) Patent No.: US 10,948,354 B2
(45) Date of Patent: Mar. 16, 2021

(54) MEASURING PEOPLE-FLOW THROUGH DOORWAYS USING EASY-TO-INSTALL IR ARRAY SENSORS

(71) Applicant: Robert Bosch GmbH, Stuttgart (DE)

(72) Inventors: Sirajum Munir, Pittsburgh, PA (US); SeyyedHessamAldin Mohammadmoradi, Houston, TX (US); Omprakash Gnawali, Houston, TX (US); Charles P. Shelton, Monroeville, PA (US)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 15/997,974

(22) Filed: Jun. 5, 2018

(65) Prior Publication Data
US 2018/0348058 A1    Dec. 6, 2018

Related U.S. Application Data

(60) Provisional application No. 62/515,147, filed on Jun. 5, 2017.

(51) Int. Cl.
    G01J 5/00        (2006.01)
    F24F 11/30       (2018.01)
    (Continued)

(52) U.S. Cl.
    CPC ............. G01J 5/0025 (2013.01); F24F 11/30 (2018.01); G06T 7/20 (2013.01); G06T 7/246 (2017.01);
    (Continued)

(58) Field of Classification Search
    CPC ................ G06T 2207/30232; F24F 2120/12
    See application file for complete search history.

(56) References Cited

U.S. PATENT DOCUMENTS

2004/0208375 A1   10/2004  Gupta et al.
2006/0104488 A1    5/2006  Bazakos et al.
(Continued)

OTHER PUBLICATIONS

Written Opinion of the International Searching Authority corresponding to PCT Application No. PCT/US2018/036086, dated Sep. 21, 2018 (9 pages).
(Continued)

Primary Examiner — Nathan L Laughlin
(74) Attorney, Agent, or Firm — Maginot, Moore & Beck LLP

(57) ABSTRACT

A method of measuring people flow through a doorway using a low-resolution, low-cost infrared array is disclosed. The method includes reading a sequence of sensor data frames from the infrared array; determining a background temperature frame; determining whether sensor data frames include at least one person using noise filtering techniques; identifying at least one group of adjacent pixels corresponding to the at least one person; determining at least one location corresponding to the at least one person; and determining whether the at least one person is a same person as a person in a previous sensor data frame. Based on the matching of a same person through multiple sensor data frames, direction of movement and entry/exit events can be determined. The entry/exit events can advantageously be used to operate and HVAC system, security system, or other such system more efficiently and effectively.

20 Claims, 9 Drawing Sheets

(51) Int. Cl.
G06T 7/20 (2017.01)
G06T 7/70 (2017.01)
G06T 7/246 (2017.01)
F24F 120/12 (2018.01)
F24F 11/89 (2018.01)

(52) U.S. Cl.
CPC ............. G06T 7/70 (2017.01); F24F 11/89 (2018.01); F24F 2120/12 (2018.01); G01J 2005/0077 (2013.01); G06T 2207/10016 (2013.01); G06T 2207/10048 (2013.01); G06T 2207/30196 (2013.01); G06T 2207/30232 (2013.01); G06T 2207/30241 (2013.01); G06T 2207/30242 (2013.01)

(56) References Cited

U.S. PATENT DOCUMENTS

| | | |
|---|---|---|
| 2011/0176000 A1 | 7/2011 | Budge et al. |
| 2014/0270540 A1* | 9/2014 | Spector .............. G06T 7/60 382/199 |
| 2015/0294482 A1 | 10/2015 | Stephen et al. |
| 2015/0310302 A1* | 10/2015 | Xie .............. G06K 9/00375 382/165 |
| 2016/0335039 A1* | 11/2016 | Cho .............. G06F 3/1446 |
| 2017/0147885 A1 | 5/2017 | Aggarwal et al. |
| 2017/0186291 A1* | 6/2017 | Wenus .............. G08B 13/19608 |
| 2018/0285650 A1* | 10/2018 | George .............. G06T 7/254 |
| 2019/0309974 A1* | 10/2019 | Kostrun .............. F24F 11/46 |

OTHER PUBLICATIONS

Wikipedia Contributors, "Walking," in Wikipedia, The Free Encyclopedia, updated May 19, 2018, Accessed Jan. 23, 2017, retrieved Jun. 4, 2018, https://en.wikipedia.org/wiki/Walking (11 pages).

Barandiaran, J. et al., "Real-Time People Counting Using Multiple Lines," 9th International Workshop on Image Analysis for Multimedia Interactive Services, IEEE Computer Society, 2008 (4 pages).

Beltran, Alex et al., "ThermoSense: Occupancy Thermal Based Sensing for HVAC Control," In proceedings of 5th ACM Workshop on Embedded Systems for Energy-Efficient Buildings, ACM, 2013 (8 pages).

Farzana, Abanty et al., "Temperature of a Healthy Human (Skin Temperature)," The Physics Factbook, 2001, accessed Jan. 23, 2017, retrieved Jun. 4, 2018, https://hypertextbook.com/facts/2001/AbantyFarzana.shtml (2 pages).

"People Counter Sensor with Display," Sensor Development International, accessed Jan. 12, 2017, retrieved Jun. 4, 2018, http://www.sdinternational.nl/downloads/leaflets/People%20Counter%20-%20Display.pdf (2 pages).

Chen, Thou-Ho et al, "An Automatic Bi-Directional Passing-People Counting Method Based on Color Image Processing," in proceedings of IEEE 37th Annual International Carnahan Conference on Security Technology, pp. 200-207, 2003 (8 pages).

Fierro, Gabe et al., "Demo Abstract: Zone-level Occupancy Counting with Existing Infrastructure," in proceedings of Buildsys '12, ACM, pp. 205-206, 2012 (2 pages).

Hinat, Timothy W. et al., "Doorjamb: Unobtrusive Room-level Tracking of People in Homes using Doorway Sensors," SenSys '12, 2012 (14 pages).

Khan, M.A.A.H et al., "Infrastructure-less Occupancy Detection and Semantic Localization in Smart Environments," Mobiquitous 2015, 2015 (10 pages).

Kim, Jae-Won et al., "Real-time Vision-based People Counting System for the Security Door," In: Proc. of 2002 International Technical Conference on Circuits Systems Computers and Communications, 2002 (4 pages).

Kleiminger, Wilhelm et al., "Occupancy Detection from Electricity Consumption Data," Buildsys '13, ACM, 2013 (8 pages).

Lam, Khee Poh et al., "Occupany Detection through an Extensive Environmental Sensor Network in an Open-Plan Office Building," Eleventh International IBPSA Conference, Building Simulation 2009, pp. 1452-1459, 2009 (8 pages).

Microsoft Band, Microsoft, accessed Jan. 23, 2017, retrieved Jun. 4, 2018, https://www.microsoft.com/en-us/band (6 pages).

Munir, Sirajum et al., "Real-Time Fine Grained Occupancy Estimation using Depth Sensors on ARM Embedded Platforms," in proceedings of 23rd IEEE Real Time and Embedded Technology and Application Symposium, 2017 (12 pages).

Nasir, Nabeel et al., "Fusing Sensors for Occupancy Sensing in Smart Buildings," ICDCIT 2015, LNCS 8956, pp. 73-92, 2015, Springer (20 pages).

"Image Thresholding," OpenCV, accessed Jan. 23, 2013, retrieved Jun. 4, 2018, https://docs.opencv.org/3.4.0/d7/d4d/tutorial_py_thresholding.html (4 pages).

Pan, Shijia et al., "BOES: Building Occupancy Estimation System Using Sparse Ambient Vibration Monitoring," Proceedings of the International Society for Optics and Photonics, SPIE, 2014 (16 pages).

"Raspberry Pi Zero," Raspberry Pi Foundation, accessed Jan. 12, 2017, retrieved Jun. 4, 2018, https://www.raspberrypi.org/products/raspberry-pi-zero/ (2 pages).

Rossi, M. et al., "Tracking and Counting Moving People," in proceedings of IEEE International Conference on Image Processing, ICIP-94, vol. 3, pp. 212-216, 1994 (5 pages).

Shih, Oliver et al., "Occupancy Estimation using Ultrasonic Chirps," in proceedings of 6th International Conference on Cyber-Physical Systems, ACM, 2015 (10 pages).

Teraoka, Hidetoshi et al., "BuildingSherlock: Fault Management Framework for HVAC Systems in Commercial Buildings," Technical Report, Department of Computer Science and Engineering, University of California, San Diego, 2014 (10 pages).

Yang, Danny B. et al., "Counting People in Crowds with a Real-Time Network of Simple Image Sensors," Proceedings of the Ninth IEEE International Conference on Computer Vision (ICCV'03), pp. 1-8, 2003 (8 pages).

Zhao, Xi et al., "A People Counting System based on Face Detection and Tracking in a Video," in proceedings of 6th IEEE International Conference on Advanced Video and Signal Based Surveillance, pp. 67-72, 2009 (6 pages).

"Display People Counter—Bi-Directional," ALL-TAG, retrieved Jun. 5, 2018, https://all-tag.com/portfolio-items/display-counter-bi-directional/ (4 pages).

* cited by examiner (a) Frame without Human
(b) Frame with Human

MEASURING PEOPLE-FLOW THROUGH DOORWAYS USING EASY-TO-INSTALL IR ARRAY SENSORS

This application claims the benefit of priority of U.S. provisional application Ser. No. 62/515,147, filed on Jun. 5, 2017 the disclosure of which is herein incorporated by reference in its entirety.

FIELD

The method and system disclosed in this document relates to building occupancy sensing and, more particularly, to measuring people-flow through doorways using infrared array sensors.

BACKGROUND

Improving the energy efficiency of buildings has been an active area of research for many years and there is a global effort to reduce energy waste. Energy consumed in buildings is a large fraction of the total energy consumed by commercial and residential sectors. HVAC systems are usually the most energy consuming components in buildings. Recent advancement in Internet of Things (IoT) technologies has started a new era in modern building management. Various types of sensing platforms are being deployed to understand the in-depth behavior of the occupants for efficient building energy and occupant comfort management. Technology that can accurately estimate the number of occupants in a room could become a key enabler for many applications in this space. For example, the estimated number of occupants in the building can be used to control HVAC systems and save a significant amount of energy. Occupancy estimation is also valuable in other areas such as safety and marketing.

Conventional solutions for people counting proposed by the research community and industry sectors have failed to provide accuracy, privacy, scalability, and installation flexibility at a low-cost. Particularly, break-beam sensor based solutions, which use breaks in active IR signals to detect objects passing through a door, are the cheapest people counting solution available commercially. However, these solutions have very tight restrictions regarding the placement of break-beam sensors at a doorway. Particularly, the sensors must be placed at a specific height and pointing directly at one another, rendering the solution difficult or even impossible to deploy in some scenarios. Furthermore, break-beam sensors cannot count accurately when multiple people move simultaneously through a doorway, rendering the solution only useful for narrow doorways.

Other higher-cost solutions also present various issues. Particularly, solutions using ceiling mounted high-resolution thermal imagers can accurately count a number of people in a scene but are prohibitively expensive for large scale deployments and require training depending on the position and orientation of the sensor. RGB camera based solutions are accurate but raise significant privacy concerns that prevent deployment in many residential and commercial settings. Ultrasonic sensor based solutions require a significant amount of training to achieve reasonable occupancy estimation accuracy and are not pet-friendly.

Accordingly, it would be advantageous to provide a people counting solution provides accuracy, privacy, scalability, and installation flexibility at a low-cost.

SUMMARY

A method of measuring people flow through a doorway is disclosed. The method comprises: reading, with a processor, a sequence of sensor data frames from an infrared array that views the doorway, each sensor data frame having a grid of pixels, each pixel having a temperature value; determining, with the processor, a background temperature frame as a pixel-wise average of a predetermined number of initial sensor data frames from the sequence of sensor data frames; determining, with the processor, for each sensor data frame in the sequence of sensor data frames after the predetermined number of initial sensor data frames, whether each respective sensor data frame includes at least one person using at least one filtering technique that identifies sensor data frames that do not include at least one person; identifying, with the processor, for each sensor data frame in the sequence of sensor data frames that includes at least one person, at least one group of adjacent pixels in the respective sensor data frame corresponding to the at least one person; determining, with the processor, for each sensor data frame in the sequence of sensor data frames that includes at least one person, at least one location in the respective sensor data frame corresponding to the at least one person; and determining, with the processor, for each sensor data frame in the sequence of sensor data frames determined that includes at least one person, whether the at least one person in the respective sensor data frame is a same person as a person in a previous sensor data frame in the sequence of sensor data frames.

A sensor system for measuring people flow through a doorway is disclosed includes an infrared array having a plurality of infrared sensors arranged in as a grid and oriented to view the doorway; and a processor operably connected to the infrared array. The processor is configured to: read a sequence of sensor data frames from the infrared array, each sensor data frame having a grid of pixels, each pixel having a temperature value; determine a background temperature frame as a pixel-wise average of a predetermined number of initial sensor data frames from the sequence of sensor data frames; determine, for each sensor data frame in the sequence of sensor data frames after the predetermined number of initial sensor data frames, whether each respective sensor data frame includes at least one person using at least one filtering technique that identifies sensor data frames that do not include at least one person; identify, for each sensor data frame in the sequence of sensor data frames that includes at least one person, at least one group of adjacent pixels in the respective sensor data frame corresponding to the at least one person; determine, for each sensor data frame in the sequence of sensor data frames that includes at least one person, at least one location in the respective sensor data frame corresponding to the at least one person; and determine, for each sensor data frame in the sequence of sensor data frames determined that includes at least one person, whether the at least one person in the respective sensor data frame is a same person as a person in a previous sensor data frame in the sequence of sensor data frames.

BRIEF DESCRIPTION OF THE DRAWINGS

The foregoing aspects and other features of the method and system are explained in the following description, taken in connection with the accompanying drawings.

DETAILED DESCRIPTION

Figure 1:
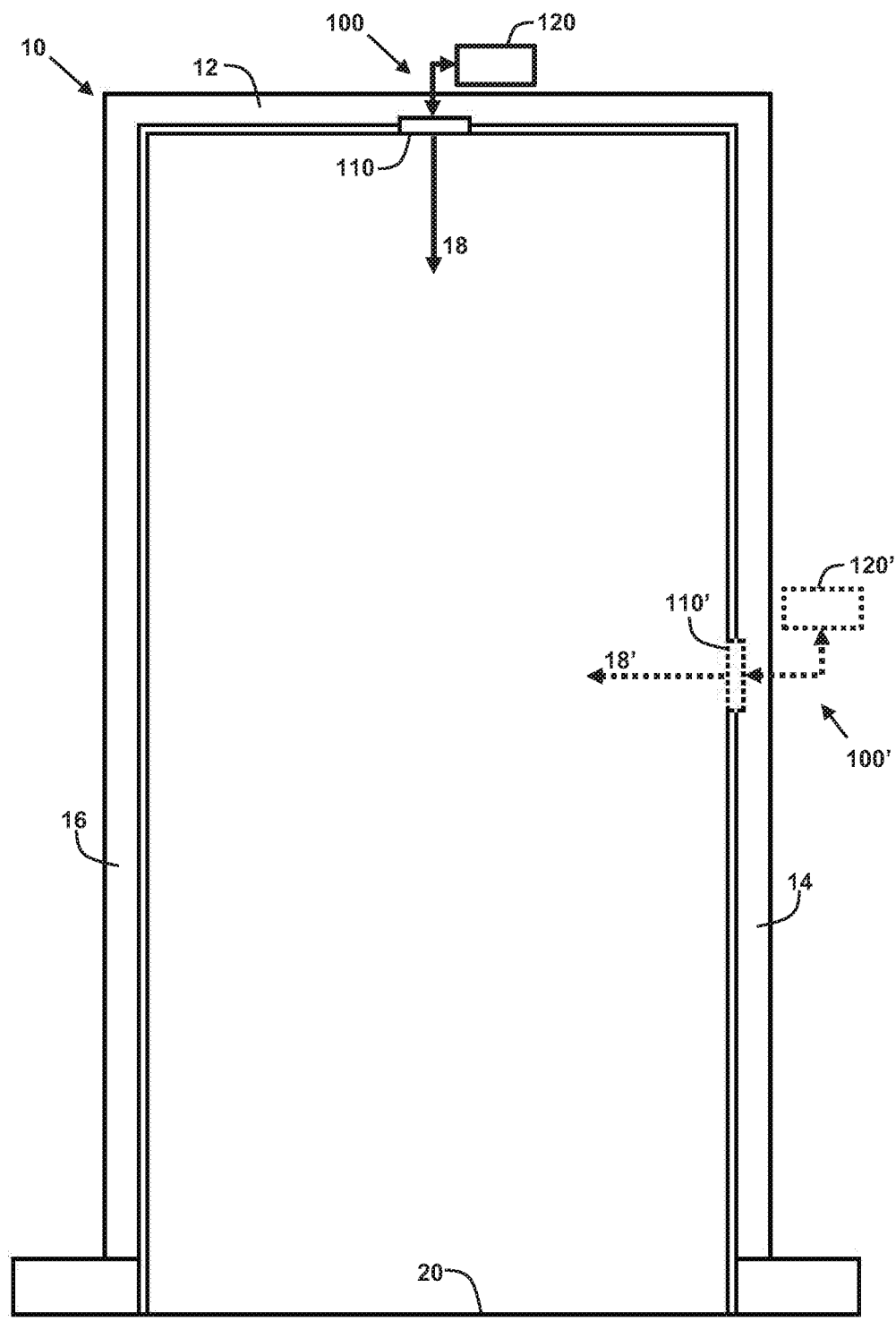
FIG. 1 is a diagrammatic view showing an exemplary embodiment of a sensor system for sensing a flow of people through a doorway.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Sensor System

Figure 2:
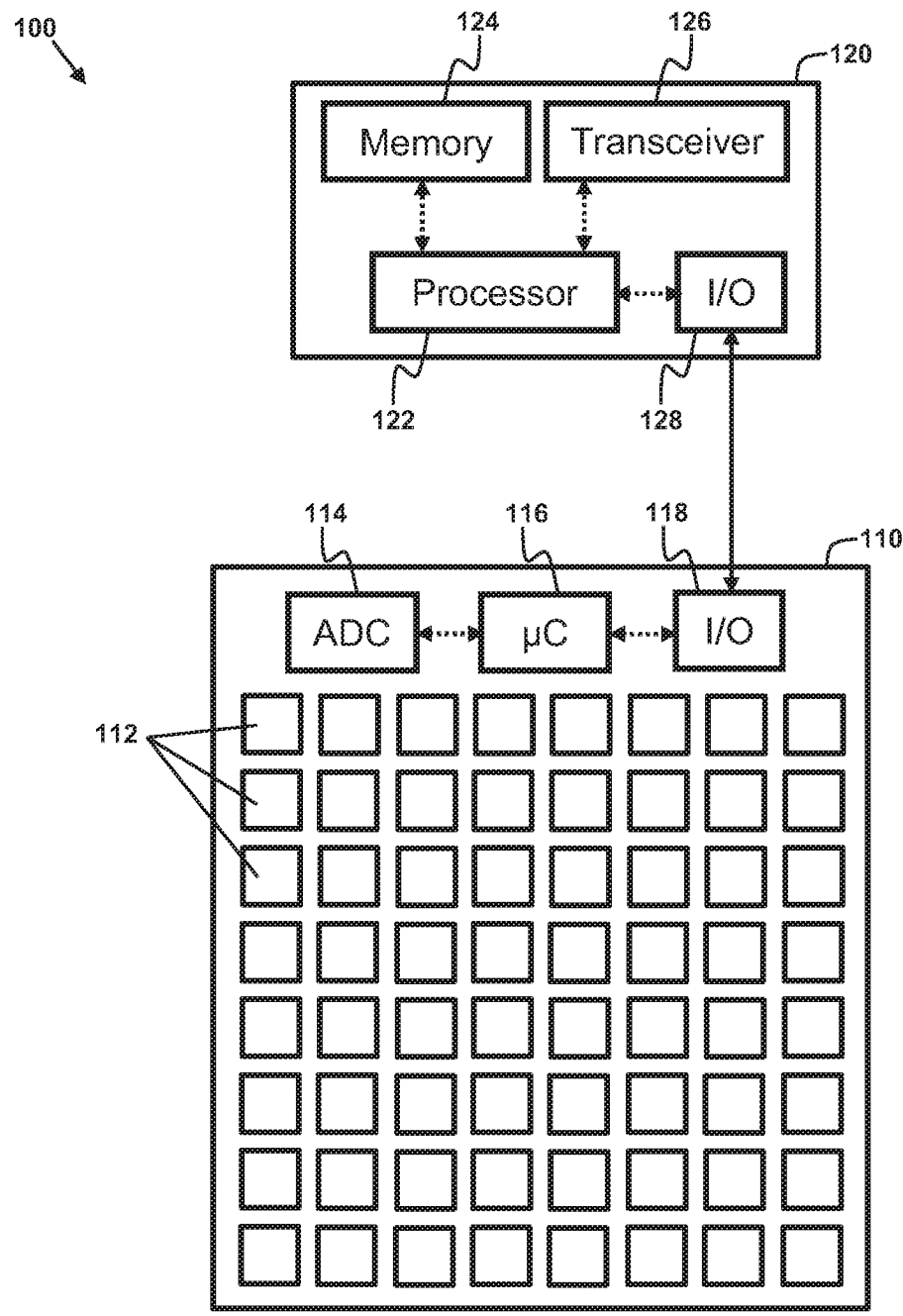
FIG. 2 is a block diagram of exemplary electronic components in infrared array and computing device of the sensor system of FIG. 1.

With reference to FIGS. 1-2, an exemplary embodiment of a sensor system 100 for sensing a flow of people through a doorway 10 is described. It will be appreciated that people counting has many applications in smart buildings. For example, adjusting HVAC systems based on the number of occupants in each room can save a significant amount of energy. In addition, security and safety of the building can be managed by determining the number and location of occupants. In some embodiments, the sensor system 100 is configured to transmit information regarding a number of people entering and exiting the doorway 10 to a central control system or the like, which uses the information to operate an HVAC system, security system, or other system. As discussed in further detail below, the sensor system 100 improves upon conventional people counting solutions by providing accuracy, privacy, scalability, and installation flexibility at a low-cost.

With reference to FIG. 1, the sensor system 100 includes an infrared (IR) array 110 operably connected to a computing device 120. In the illustrated embodiment, the sensor system 100, in particular the IR array 110, is mounted to and/or integrated with a top section 12 of the doorway 10. As will be discussed in further detail below, this configuration may have improved performance in some circumstances (e.g., wide doorways or short doorways). However, in another embodiment indicated with the labels 100', 110', and 120', the sensor system 100' can be mounted to and/or integrated with one of the side sections 14 or 16 of the doorway 10, which may provide improved performance in other circumstances (e.g., narrow doorways or tall doorways).

Generally, installing the IR array 110 at the top of the doorway has the advantage of more easily detecting multiple people in the frame, which is a more common scenario for wide doorways. However, installing the IR array 110 on top of a very tall doorway may result lower accuracy. In contrast, if the IR array 110 is installed in the side of a doorway, the sensor can see a significant portion of the body resulting in higher accuracy in some circumstances. However, if two people walk in close distance, the person closer to the sensor occludes the other person. Accordingly, the side mounted solution is most appropriate for a narrow door, where two people usually do not enter simultaneously.

With reference to FIG. 2, an exemplary embodiment of the IR array 110 is shown. The IR array 110 includes a relatively low-resolution array of IR sensors 112 (e.g., an 8×8 array as shown). Each IR sensor 112 is configured to detect infrared light and provide an output signal representing the detected infrared light. In one embodiment, the IR sensors 112 may be arranged so as to provide a predetermined field of view (e.g., a 60° field of view). In at least one embodiment, the IR array 110 includes an analog-to-digital converter 114 configured to convert the output signals into digital sensor data. In one embodiment, IR array 110 includes a microcontroller 116 configured to receive the digital sensor data from the analog-to-digital converter 114. The microcontroller 116 may be any of various microcontrollers or microprocessors as will be recognized by those of ordinary skill in the art.

In one embodiment, the microcontroller 116 is configured to perform various pre-processing steps on the digital sensor data, such as timestamping the digital sensor data and/or packaging the sensor data into image frames (e.g., 8×8 image frames) at a predetermined or adjustable framerate (e.g., 10 Hz). In some embodiments, the microcontroller 116 is configured to perform further processing of the digital sensor data to determine additional digital outputs including thermal presence, direction, and temperature values based on the digital sensor data. In one embodiment, the, the microcontroller 116 is configured to operate in conjunction with an I/O interface 118 to output the digital sensor data (pre-processed or otherwise) and the additional digital outputs to an external device (e.g., the computing device 120) for further processing and usage thereat. In one embodiment, the IR array 110 may be configured to operate in various different power modes with differing power usages, such as a normal mode using 4.5 mA, a sleep mode using 0.2 mA, and a standby mode using 0.8 mA.

It is appreciated that the embodiment of the IR array 110 shown in FIG. 2 is only one exemplary embodiment of an IR array 110. As such, the exemplary embodiment of the IR array 110 of FIG. 2 is merely representative of any of various manners or configurations of IR arrays that are operative in the manner set forth herein.

Returning to FIG. 1, the IR array 110 is mounted to and/or integrated with the doorway 10 such that the array of IR sensors 112 faces a direction that is orthogonal to the inner portion or frame of the doorway 10. For example, in embodiments in which the IR array 110 mounted to and/or integrated with top section 12 of the doorway 10, the array of IR sensors 112 faces a direction 18 toward a floor 20. Similarly, in embodiments in which the IR array 110 mounted to and/or integrated with one of the side sections 14 of the doorway 10, the array of IR sensors 112 faces a direction 18' toward the other of the side sections 16. However, the sensor system 100 has robust performance even if the IR array 110 is mounted an off-orthogonal angle due to a mounting error or mounting constraints because it can still sense people in the frame when mounted at an off-orthogonal angle.

With reference to FIG. 2, an exemplary embodiment of the computing device 120 is shown. The computing device 120 includes a processor 122, memory 124, a transceiver 126, and an I/O interface 128. The processor 122 may be any of various processors as will be recognized by those of ordinary skill in the art. It will be recognized by those of ordinary skill in the art that a "processor" as used herein includes any hardware system, hardware mechanism or hardware component that processes data, signals, and/or other information. A processor can include a system with a central processing unit, multiple processing units, dedicated circuitry for achieving functionality, and/or other systems. The processor 122 is operably connected to the memory 124, the transceiver 126, and the I/O interface 128 and is configured to operate in conjunction with an I/O interface 128 to receive the digital sensor data (pre-processed or otherwise) and/or any additional digital outputs from the IR array 110.

The memory 124 is configured to store program instructions that, when executed by the processor 122, enable the computing device 120 to provide the features, functionality, characteristics and/or the like as described herein. The memory 124 may be of any type of device capable of storing information accessible by the processor 122, such as a memory card, ROM, RAM, write-capable memories, read-only memories, hard drives, discs, flash memory, or any of various other computer-readable medium serving as data storage devices as will be recognized by those of ordinary skill in the art.

The transceiver 126 may be any of various devices configured for communication with other electronic devices, including the ability to send communication signals and receive communication signals. The transceiver 126 may include different types of transceivers configured to communicate with different networks and systems. In one embodiment, the transceiver 126 is configured to exchange data using a protocol such as Wi-Fi, Bluetooth, RFID, NFC, ZigBee, Z-Wave, or Ethernet.

It is appreciated that the embodiment of the computing device 120 shown in FIG. 2 is only one exemplary embodiment of a computing device 120. As such, the exemplary embodiment of the computing device 120 of FIG. 2 is merely representative of any of various manners or configurations of computing devices that are operative in the manner set forth herein.

Method of Measuring People Flow Through a Doorway

Methods for operating the sensor system 100 are described below. In particular, methods of operating the IR array 110 and/or the computing device 120 to measure people flow through the doorway 10 are described. In the description of the methods, statements that a method is performing some task or function refers to a controller or general purpose processor executing programmed instructions stored in non-transitory computer readable storage media operatively connected to the controller or processor to manipulate data or to operate one or more components in the sensor system 100 to perform the task or function. Particularly, the processor 122 of the computing device 120 and/or the microcontroller 116 of the IR array 110 above may be such a controller or processor. Alternatively, the controller or processor may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 3:
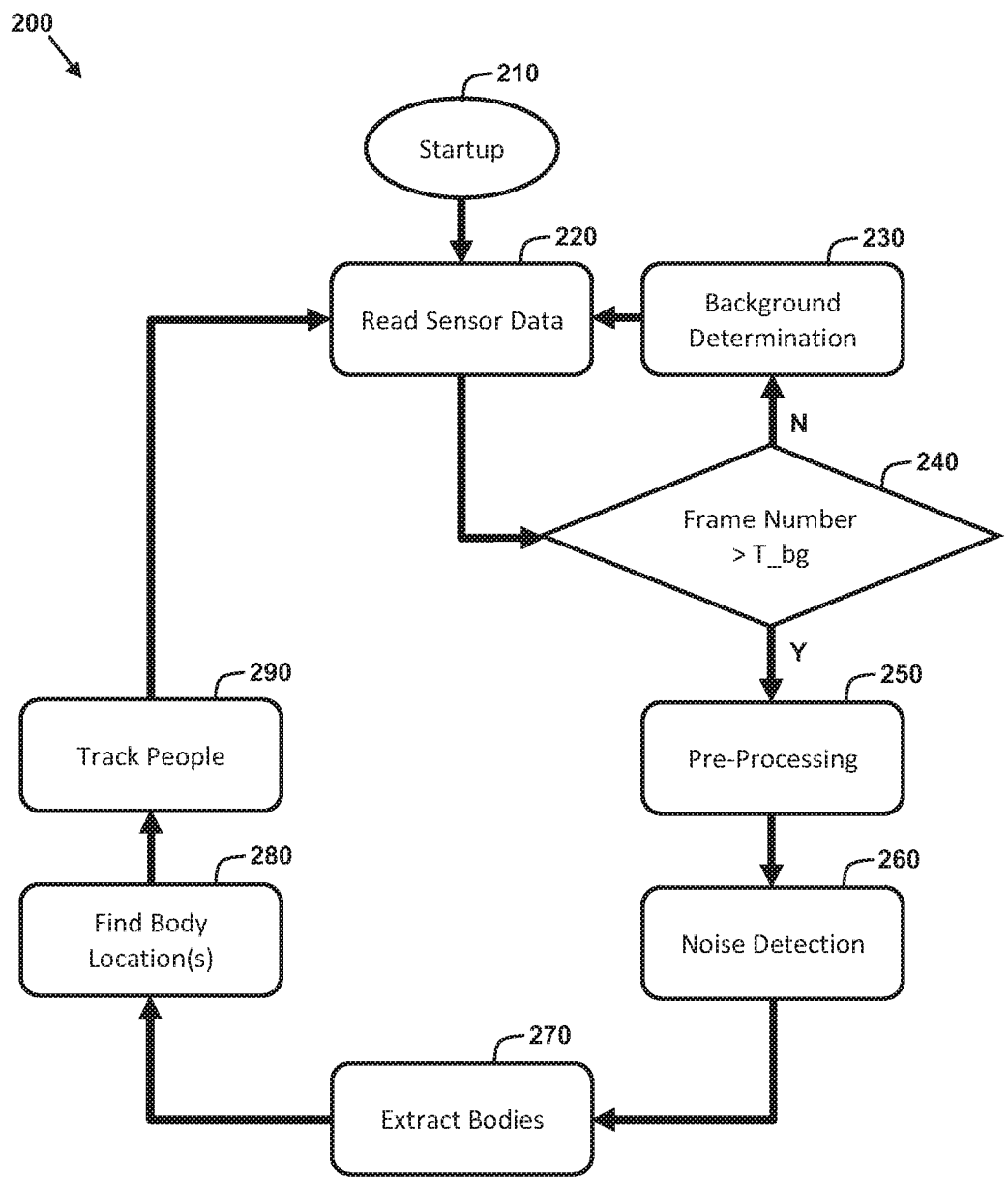
FIG. 3 shows a logical flow diagram for a method of measuring people flow through the doorway.

FIG. 3 shows a logical flow diagram for a method 200 of measuring people flow through the doorway. Particularly, the method 200 at least detects entry and exit events of people moving through a doorway. The method 200 improves upon the functioning of the processor 122 of the computing device 120 and/or the microcontroller 116 of the IR array 110 by enable it/them to accurately detect entry and exit events of people moving through a doorway using low-cost and low-resolution IR sensor arrays. Additionally, the method 200 is performed in real-time, is privacy preserving, and has fewer deployment constraints compared to conventional solutions. Particularly, the placement and orientation of the IR array 100 is not as constrained as conventional break-beam sensor based solutions. Additionally, the solution has almost no privacy concerns because the resolution is so low and human body temperature is so similar that it is almost impossible to uniquely identify occupants. The method 200 advantageously deals with realistic and dynamic changes in the sensing environment by leveraging a combination of Otsu's thresholding and modeling thermal noise distribution. Experimental results show an average of 93% accuracy in estimating the number of occupants in rooms. The lightweight, low power, and low cost nature of the sensor system 100, in conjunction with the method 200, makes it an affordable solution for large scale deployments, e.g., commercial buildings, academic buildings, hospitals, restaurants, and shopping centers.

Upon start up (block 210), the method 200 begins with a step of reading a sequence of sensor data frames from an infrared array, each sensor data frames having a grid of pixels, each pixel having a temperature value (block 220). Particularly, with respect to the embodiments described in detail herein, the processor 122 of the computing device 120 is configured to, upon startup, execute instructions stored on the memory 124 to receive and/or read digital sensor data from the IR array 110. In at least one embodiment, the processor 122 is configured to receive and/or read the digital sensor data in the form of a chronological sequence of sensor data frames (e.g., 8×8 frames) at a predetermined framerate (e.g., 10 Hz). Each sensor data frame includes a plurality of pixels organized in a grid (e.g., an 8×8 grid) having dimensions equal to the resolution of the IR array 110. In one embodiment, the processor 122 is configured to operate the memory 124 to temporarily store the received sensor data frames in a buffer and/or queue for processing.

The method 200 continues with a step of determining a background temperature frame as a pixel-wise average of a first predetermined number of sensor data frames from the sequence of sensor data frames (blocks 230 and 240). Particularly, with respect to the embodiments described in detail herein, the processor 122 of the computing device 120 is configured to execute instructions stored on the memory 124 to determine a background temperature frame representing the background temperature pattern and/or infrared pattern of the doorway 10 as seen by the IR array 10. In at least one embodiment, the processor 122 is configured to calculate a pixel-wise average of the first predetermined number $T\_bg$ of sensor data frames (e.g., first 250 frames). The processor 122 is configured to form the background temperature frame as grid of pixels (e.g., 8×8 grid) having values equal to the average of the corresponding pixel values in the first predetermined number $T\_bg$ of sensor data frames. In one embodiment, the processor 122 is configured to recalculate the background temperature frame periodically (e.g., every 7 days).

A key requirement during this background determination phase is absence of temporal heat sources such as humans or hot objects in the scene. In some embodiments, the processor 122 is configured to determine the background temperature frame only if no temporal heat sources are detected. In one embodiment, the processor 122 is configured to restart the background determination phase in response to sensor data frames including pixels that have changed by a predetermined threshold during background determination phase, indicating the presence of a temporal heat source. In one embodiment, the sensor system 100 may include an additional sensor, such as a PIR sensor (not shown), configured to detect temporal heat sources during the background determination phase.

The method 200 continues with a step of preprocessing each of the received frames of sensor data (block 250). Particularly, with respect to the embodiments described in detail herein, the processor 122 of the computing device 120 is configured to execute instructions stored on the memory 124 to increase the resolution of the received sensor data frames using linear interpolation of the measured pixels of each frame. In one embodiment, the processor 122 is configured to increase the resolution of every frame, including the first predetermined number T_bg of sensor data frames used to determine the background temperature frame. In other embodiments, the processor 122 is configured to simply increase the resolution of the background temperature frame after determination thereof and increase the resolution of each frame after the first predetermined number T_bg of sensor data frames. In some embodiments, additional preprocessing step may be performed.

Figure 4:
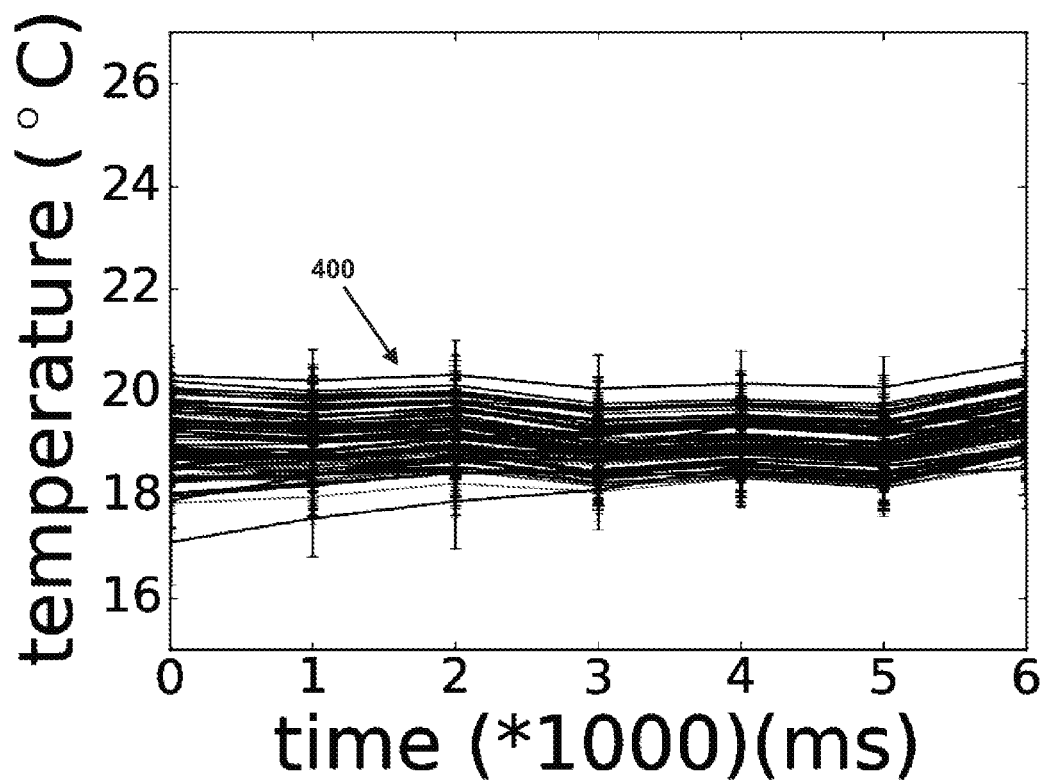
FIG. 4 shows temperature readings from each pixel of an exemplary IR array during a test in which the IR array is placed at a close distance to a foam plate.

The method 200 continues with a step of determining, for each sensor data frame after the first predetermined number of sensor data frames from the sequence of sensor data frames, whether the respective frame includes at least one person using at least one noise filtering technique (block 260). Particularly, with respect to the embodiments described in detail herein, the processor 122 of the computing device 120 is configured to execute instructions stored on the memory 124 to perform a noise filtering process on each of the received sensor data frames. Particularly, low power IR array sensors can be quite prone to noise. FIG. 4 shows temperature readings 400 from each pixel of an exemplary IR array during a simple test in which the exemplary IR array is placed at a close distance (1 cm) to a foam plate. Ideally, each pixel should report the same temperature because the foam is covering the whole sensor's field of view. However, as can be seen in FIG. 4, there are significant variations in the reported temperature values. Each pixel shows significant oscillations in its reported temperature over time. In addition to inherent noise in the sensor, change in deployment environment's characteristics like ambient temperature causes a significant impact on the sensor's reports. This experiment shows that pixel value fluctuations are large (−2.5° C., 2.5° C.) and frequent such that the exemplary IR array cannot be calibrated at a pixel level.

Accordingly, a noise filtering process is utilized to differentiate frames with and without humans. Particularly, for each sensor data frame, the processor 122 is configured to determine whether one or more criteria or filtering techniques are satisfied.

As a first criterion or filtering technique, the processor 122 is configured to consider a histogram/frequency distribution of pixel value deviations from the background temperature frame. Particularly, based on each sensor data frame, the processor 122 is configured to calculate a histogram/frequency distribution of pixel value deviations from the background temperature frame. The processor 122 is configured to detect whether the histogram/frequency distribution includes a first local maximum and a second local maximum that has a smaller amplitude than the first local maximum. The processor 122 is configured to determine whether the smaller second local maximum is at least a predetermined threshold amplitude compared to the amplitude of the first local maximum and/or at least a predetermined threshold width compared to the width of the first local maximum (e.g., width at least 50% of largest width and/or amplitude at least 40% of largest amplitude).

Figure 5:
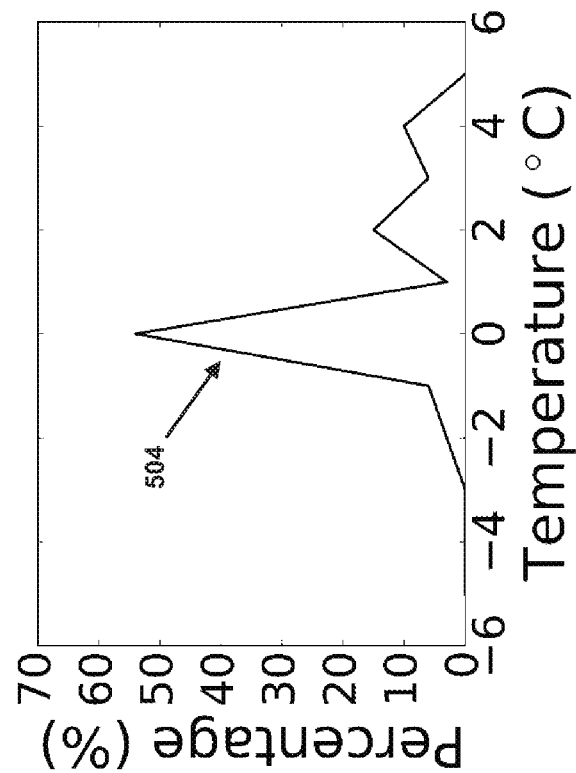
FIG. 5 shows exemplary histogram distributions of pixel value deviations from the background temperature frame.
Figure 5:
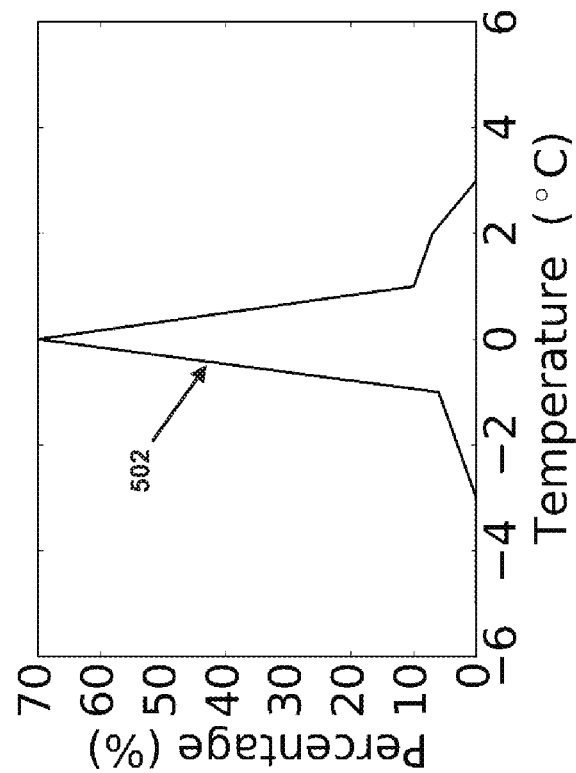

FIG. 5 shows exemplary histogram distribution of pixel value deviations from the background temperature frame. The plot (a) on the left shows a distribution of difference values 502 from a frame without a human. The plot (b) on the right shows a distribution of difference values 504 from a frame with a human. As can be seen, thermal noise without a human follows a common distribution that is significantly different from the distribution of pixel difference values when someone comes in front of the sensor. When there is a human in the scene, the distribution of pixel difference values is wider (compared to the distribution in a scenario without a human) and has multiple spikes. This characteristic is used to differentiate frames with and without humans. The biggest spike in the distribution is due to background temperature and second biggest spike corresponds to a human inside the frame. If the second biggest spike is larger than the predetermined thresholds, then the criterion is satisfied and the frame may be considered to include a human. Otherwise, if the second biggest spike is not larger than the predetermined thresholds, then the criterion is not satisfied and the frame is discarded as being noise and not including a human.

Figure 6:
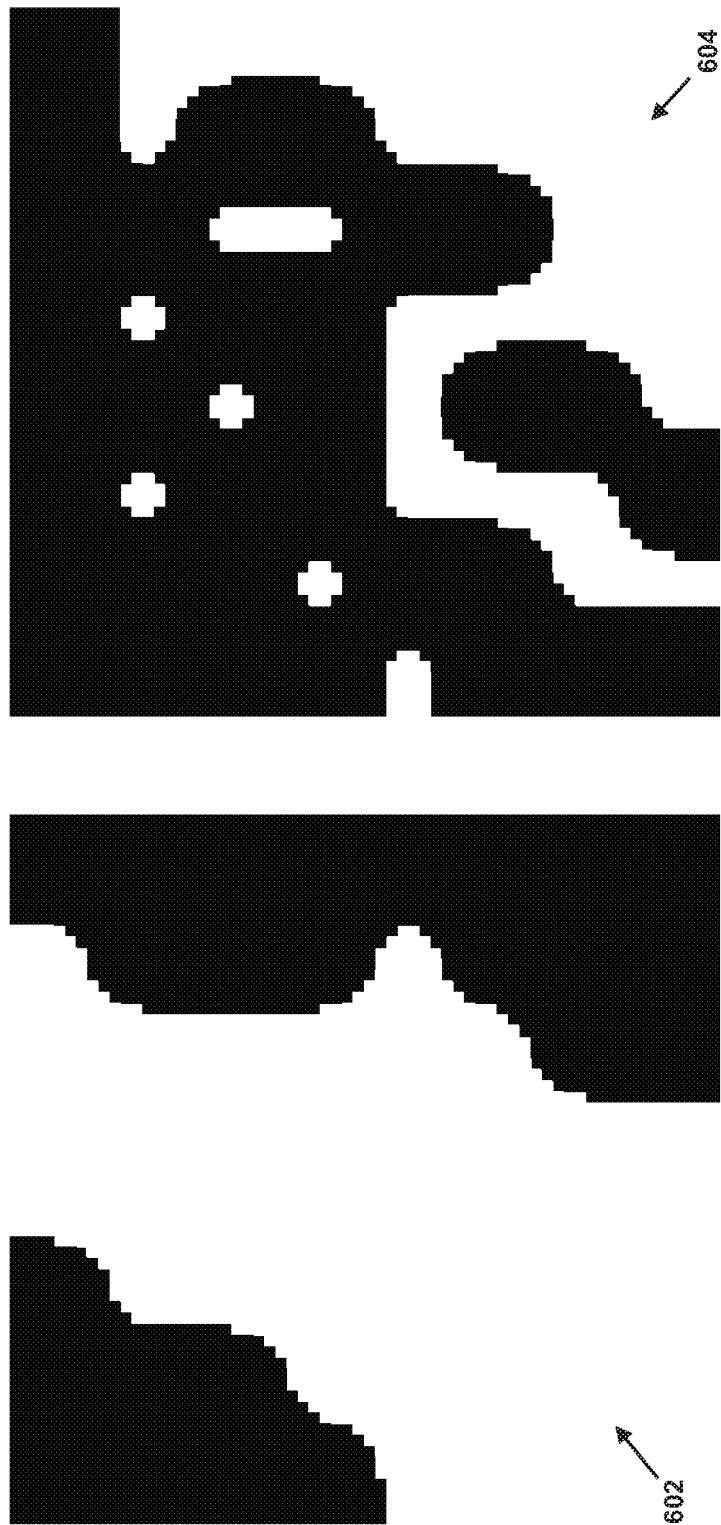
FIG. 6 shows exemplary frames classified as with and without humans after applying Otsu's thresholding.

As a second criterion or filtering technique, the processor 122 is configured to consider binarization which divides the pixels of the frame into human and background classes. Particularly, some frames without humans pass the above criterion because the noise in the sensor data causes the pixel value distribution to be different from the modeled distribution of the frame without humans. In order to mitigate this problem, based on each sensor data frame, the processor 122 is configured to compare the value of each pixel with a threshold and mark the pixel as human if the pixel value exceeds the threshold and as background if the pixel value does not exceed the threshold. In at least one embodiment, the processor 122 is configured to calculate the threshold use Otsu's Binarization Method in which a plurality of thresholds are tested and the threshold is selected as the one which minimizes the intra-class variance (the variance within the class), defined as a weighted sum of variances of the two classes. FIG. 6 shows exemplary frames classified as with and without humans after applying Otsu's thresholding on them. The plot (a) on the left shows a frame 602 with a human. The plot (b) on the right shows a frame 604 without a human.

Once the frame is divided into human and background classes, the processor 122 is configured to calculate an average value and/or average temperature of the pixels in each class. If a difference between the average value and/or average temperature of each class is greater than a predetermined threshold (e.g., 0.75° C.), then the criterion is satisfied and the frame may be considered to include a human. Otherwise, if the difference between the average value and/or average temperature of each class is less than the predetermined threshold (e.g., 0.75° C.), then the criterion is not satisfied and the frame is discarded as being noise and not including a human.

As a third criterion or filtering technique, the processor 122 is configured to consider the average pixel value and/or average temperature of the frame. Particularly, the processor 122 is configured to calculate an average value of the pixels in the background temperature frame. Furthermore, based on each sensor data frame, the processor 122 is configured to calculate an average value of the pixels thereof. The processor 122 is configured to compare the average for each frame with the average for the background temperature frame. If the average for the respective frame is at least a predetermined threshold (e.g., 0.25° C.) greater than the average for the background temperature frame, then the criterion is satisfied and the frame may be considered to include a human. Otherwise, if the average for the respective frame is not at least the predetermined threshold (e.g., 0.25° C.) greater than the average for the background temperature frame, then the criterion is not satisfied and the frame is discarded as being noise and not including a human.

In some embodiments, the processor 122 is configured to use only one of the criteria or filtering techniques described above. However, in at least some embodiments, the processor 122 is configured to discard any frames that do not satisfy all three of the criteria or filtering techniques described above. Particularly, if all of the criteria or filtering techniques are satisfied, then the processor 122 is configured to continue processing the sensor data frame being a frame with humans. However, if one of the criteria or filtering techniques is not satisfied, then the processor 122 is configured to discard the sensor data frame as being noise or as being without humans.

Figure 7:
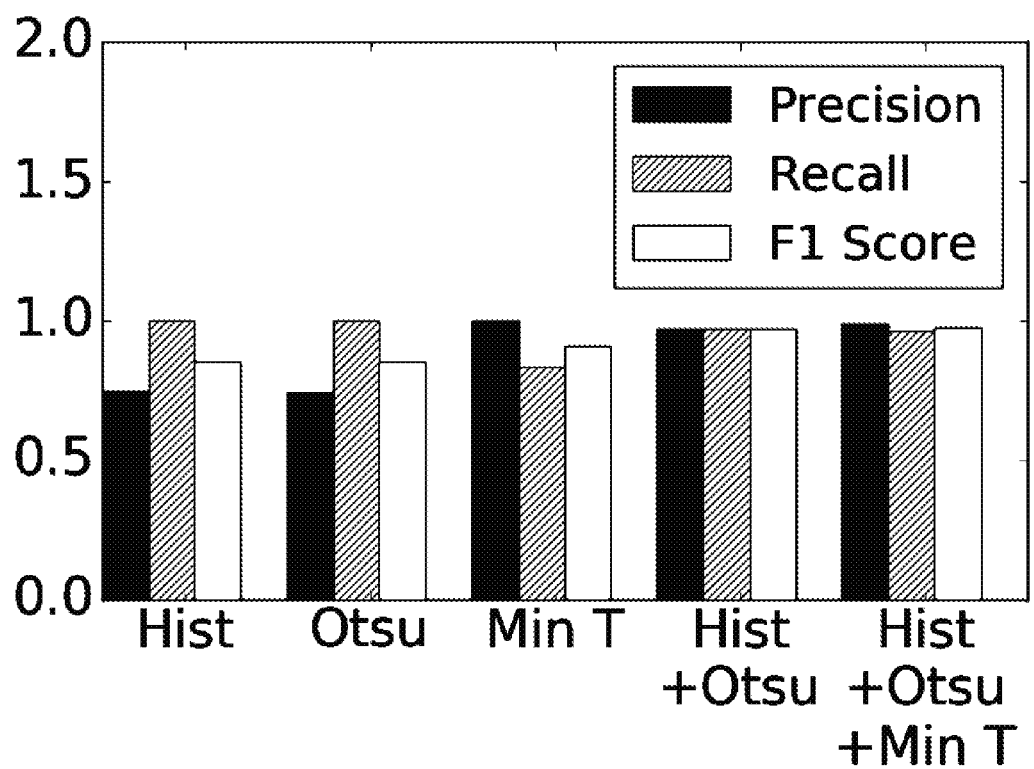
FIG. 7 shows experimental performance differences between different combinations of noise filtering techniques.

FIG. 7 shows experimental performance differences between using each filtering technique individually, using heat distribution detection (histograms) and Otsu's thresholding criteria, and using all three filtering techniques: heat distribution detection, Otsu's thresholding, and minimum temperature filtering. In the experiments, data was collected from different peoples' walk (10 individuals) and each technique was used to identify noisy frames from the ones with humans inside. Each frame was manually tagged to obtain the ground truth. FIG. 7 shows the precision, the recall, and the F1 score of the different combinations of filtering techniques after running each technique on the same set of frames (100 frames). As can be see, combining heat distribution detection, Otsu's thresholding, and minimum temperature filtering techniques achieves the best performance.

The method 200 begins with a step of identifying, for each frame determined to include at least one person, at least one group of adjacent pixels in the respective sensor data frame corresponding to the at least one person (block 270). Particularly, with respect to the embodiments described in detail herein, the processor 122 of the computing device 120 is configured to execute instructions stored on the memory 124 to, for each of the received sensor data frames determined to include a person, identify one or more groups of adjacent pixels (which may be referred to herein as "bodies") in the frame corresponding to one or more people. Particularly, the processor 122 is configured to detect multiple people in the scene and extract their bodies for tracking. If two people walk very closely, due to the limited resolution and accuracy of IR array 110, the processor 122 cannot easily detect two people. However, if there is a small gap between them, the processor 122 detects and tracks both persons in the following frames.

Figure 8:
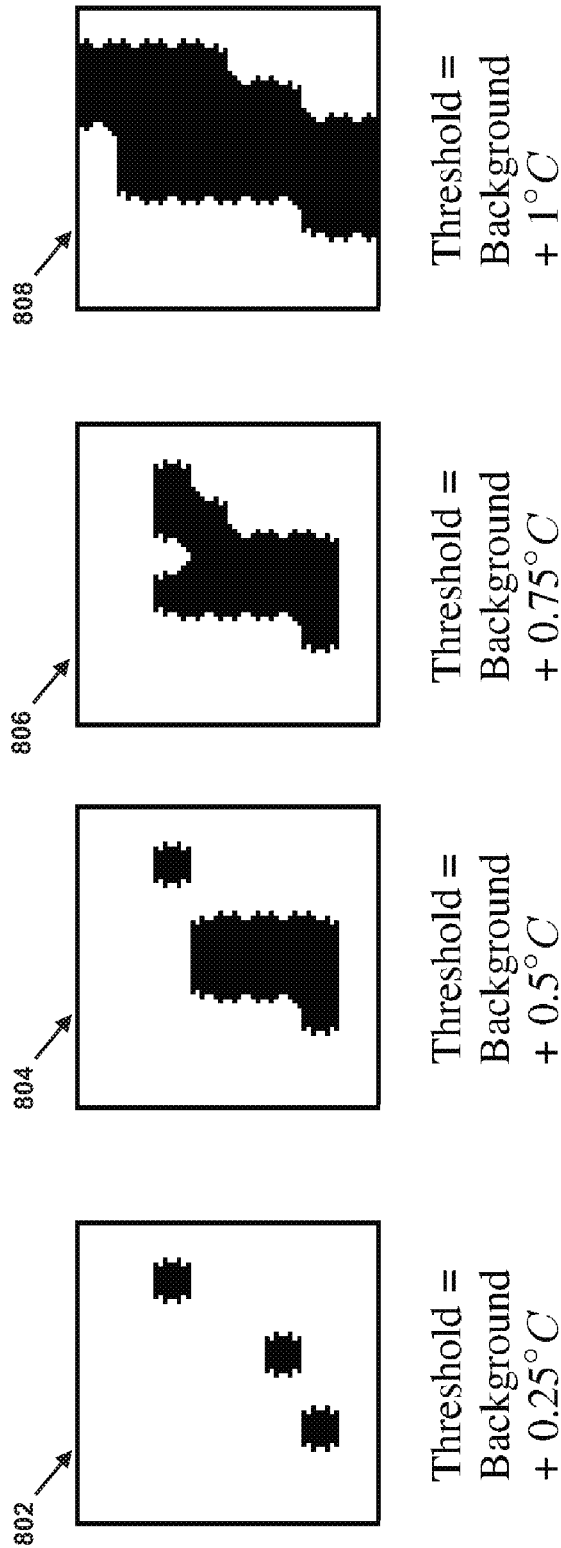
FIG. 8 shows exemplary threshold frames after application of different temperature thresholds to an exemplary sensor data frame.

In order to find the gap between two human bodies, the processor 122 is configured to apply a series of different thresholds to the respective sensor data frame. Particularly, the processor 122 is configured to generate a threshold frame/intermediate data frame by comparing each pixel of the respective sensor data frame from with a threshold equal to the value of the corresponding pixel of the background temperature frame plus a predetermined temperature interval (e.g., the background temperature +0.25° C.). For each pixel of the respective sensor data frame having a value that is greater than the threshold (i.e., greater than the background temperature +0.25° C.), the processor 122 is configured to set the value of the corresponding pixel of the threshold frame to a first value (e.g., 1). For each pixel of the respective sensor data frame having a value that is less than the threshold (i.e., less than the background temperature +0.25° C.), the processor 122 is configured to set the value of the corresponding pixel of the threshold frame to a second value (e.g., 1). FIG. 8 shows an exemplary threshold frame 802 after application of the initial threshold equal to the background temperature +0.25° C. to an exemplary sensor data frame. The pixels having the value 0 are show as black and the pixels having the value 1 are show as white.

Next, the processor 122 is configured to identify groups of pixels in threshold frame having the first value (e.g., 1). If the size of an identified group of pixels is less than a predetermined percentage (e.g., 30%) of the total frame size, then the group of pixels corresponds to one person in the frame and the processor 122 is configured to identify the corresponding group of pixels in the respective sensor data frame as corresponding to a person. If the size of an identified group of pixels is larger than a predetermined percentage (e.g., 30%) of the total frame size, then there is a possibility that the group of pixels corresponds to two people in the frame and the processor 122 is configured to generate a further threshold frame by comparing each pixel of the respective sensor data frame from with an increased threshold equal to the value of the corresponding pixel of the background temperature frame plus an incrementally larger predetermined temperature interval (e.g., the background temperature +0.5° C.). Next, the processor 122 is configured to identify groups of pixels in new threshold frame having the first value (e.g., 1).

The processor 122 is configured to continue iteratively generating threshold frames with incrementally larger thresholds until it identifies two different groups of pixels having the first value (e.g., 1) which have a size greater than a further predetermined percentage (e.g., 10%) of the total frame size or it identifies only one group of pixels having the first value (e.g., 1) which have a size less than the further predetermined percentage (e.g., 10%) of the total frame size. FIG. 8 shows further exemplary threshold frames 804, 806, and 808 after application of the thresholds equal to the background temperature +0.5° C., +0.75° C., and +1° C., respectively, to the exemplary sensor data frame. The processor 122 is configured to stop iteratively generating threshold frames in response to identifying two different groups of pixels having the first value (e.g., 1) which have a size greater than the further predetermined percentage (e.g., 10%) of the total frame size, indicated that two human bodies are present in the frame, or in response to identifying only one group of pixels having the first value (e.g., 1) which have a size less than the further predetermined percentage (e.g., 10%) of the total frame size. As can be seen in FIG. 8, after application of the threshold equal to the background temperature +1° C., two distinct groups of pixels having the value 1 appear which correspond to two persons in the frame. After the iterative process, the processor 122 is configured to identify the corresponding groups of pixels in the respective sensor data frame as corresponding to a person.

Figure 9:
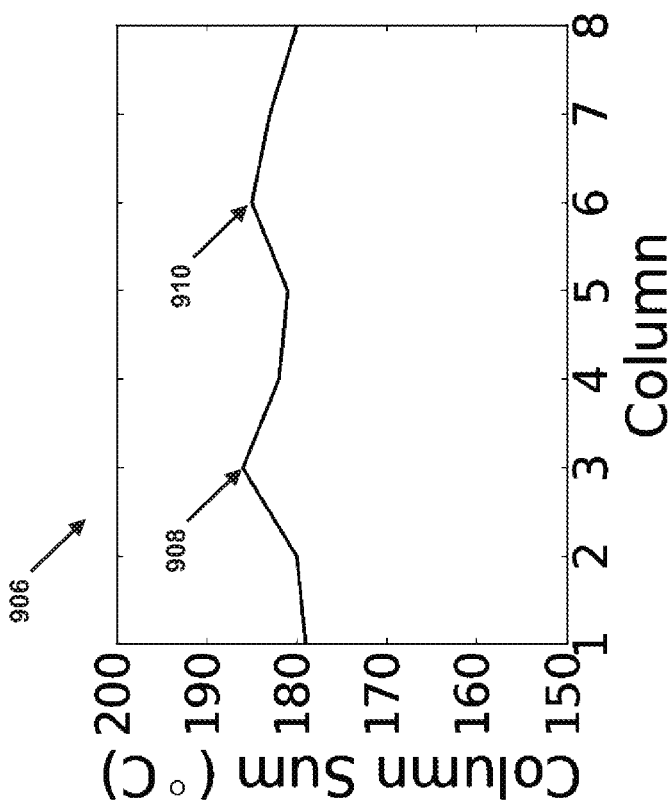
FIG. 9 shows plots comparing the sums of each column of an exemplary frame having only one person and an exemplary frame having two people.
Figure 9:
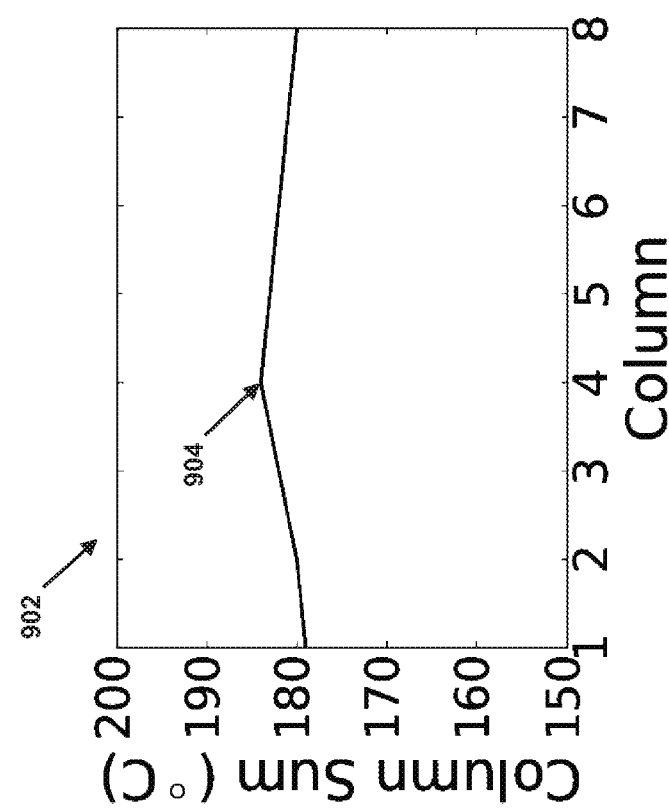

The method 200 begins with a step of determining, for each frame determined to include at least one person, at least one location in the respective sensor data frame corresponding to the at least one person (block 280). Particularly, with respect to the embodiments described in detail herein, the processor 122 of the computing device 120 is configured to execute instructions stored on the memory 124 to, for each of the received sensor data frames determined to include a person or people, determine at least one location in the respective sensor data frame corresponding to the person or people. Particularly, the processor 122 is configured to calculate a sum of the values of the pixels in each column or in each row of the respective sensor data frame. Next, the processor 122 is configured to identify, for each person in the respective sensor data frame, a local maximum in the calculated sums of values in each column or row. For example, if it was determined that only one person is in the sensor data frame, the processor 122 is configured to compare the sums of values in each column or row to find a maximum. FIG. 9 shows a plot 902 comparing the sums of each column of an exemplary frame having only one person. As can be seen, starting from one side of the frame, there is a gradual increase in the column values going up to a maximum value 904 and after that, a gradual decrease. The location of maximum value is considered as the location of the person. Similarly, for example, if it was determined that two people are in the sensor data frame, the processor 122 is configured to compare the sums of values in each column or row to find two largest local maximums. FIG. 9 shows a plot 906 comparing the sums of each column of an exemplary frame having two people. As can be seen, starting from one side of the frame, there is a gradual increase to a first local maximum 908 corresponding to a location of a first person. After that, there is a decrease, a further increase to a second local maximum 910 corresponding to a location of a second person, and a gradual decrease.

The method 200 begins with a step of matching, for each frame determined to include at least one person, the at least one person in the respective sensor data frame to the at least one person in a previous sensor data frame (block 290). Particularly, with respect to the embodiments described in detail herein, the processor 122 of the computing device 120 is configured to execute instructions stored on the memory 124, for each of the received sensor data frames determined to include a person or people, match the identified person or people in the respective sensor data frame to a person or people in a previous sensor data frame. Based on the matched persons between frames, the processor 122 is configured to determine a direction of movement of the matched persons. In one embodiment, the processor 122 is configured to store a unique identifier in the memory 124 corresponding to each person in the frame. The matching of a person over several frames and the determination of the direction of movement thereof enables the processor 122 to detect entry and exit events in the doorway 10. Additionally, the determination of the direction of movement enables the processor 122 to distinguish between people walking through the doorway 10 and other activities in the doorway such as standing in the doorway 10 for a long time, walking back and forth in the doorway 10, or waving hands through the doorway 10.

Due to noise and limited field of view challenges, direction of movement cannot be extracted from a single frame. In order to track the same person across several frames, the processor 122 is configured to extract a few features from each frame and matches previously seen people to newly found bodies utilizing the extracted features.

Particularly, as discussed above, the processor 122 determines location(s) of one or more people in each sensor data frame. The processor 122 is at least configured to determine a difference between the locations of persons identified in a current sensor data frame and locations of persons identified in at least one previous frame. Based on the difference between the locations of each person, the processor 122 is configured to determine whether a person of a current frame is the same as a person of a previous frame. Particularly, if the difference between a location of an identified location of a person in the current frame and an identified location of a person in the previous frame is less than a predetermined threshold distance, then the processor 122 is configured to determine that the two bodies are the same person. If the difference between a location of an identified location of a person in the current frame and an identified location of a person in the previous frame is greater than the predetermined threshold distance, then the processor 122 is configured to determine that the two bodies are the same person. In one embodiment, the predetermined threshold distance is equal to a predetermined percentage (e.g. 10%) of a width of the frames.

In one embodiment, the processor 122 is configured to determine an average temperature of each person in each frame. Particularly, the processor 122 is configured to determine an average temperature of the pixels in the group of pixels identified as corresponding to each respective person. If a person in the current frame is matched to a person of a previous frame, the processor 122 is configured to determine a difference between the average temperature of person and the average temperature of the person determined with respect to the previous frame. If the difference between average temperature between the current frame and the previous frame exceeds a predetermined threshold (e.g., 1° C.), then the processor 122 is configured to treat the bodies as different persons, even if they were matched based on their respective locations. If the difference between average temperature between the current frame and the previous frame is less than the predetermined threshold (e.g., 1° C.), then the processor 122 is configured to configured to determine that the two bodies are the same person.

Finally, the processor 122 is configured to compare the locations and average temperatures of persons in the current frame only with a predetermined number (e.g., 5) of most recent previous frames. Thus, two persons identified in different frames can only be matched as being the same person if they are with the predetermined of frames (e.g., within 5 frames from one another.

In one embodiment, once the identified persons of the current frame are matched with persons of previous frames based on location and average temperature, the processor 122 is configured to determine a direction of movement of each person based on a comparison of the locations of each person over at least two frames. In one embodiment, the processor 122 is configured to detect an entry event or an exit event in response to a first person being identified in a first sensor data frame of the sequence of sensor data frames but not being identified in a second sensor first sensor data frame of the sequence of sensor data that is subsequent to the first sensor data frame. In one embodiment, the processor 122 is configured to detect the entry event or the exit event depending on a direction of movement of the first person.

In one embodiment, the processor 122 is configured to operate transceiver 126 to transmit information regarding entry events, exit events, and the average temperatures of detected persons to a central control system or the like, which uses the information to operate an HVAC system, security system, or other system. Particularly, in one embodiment, entry and exit events are used to calculate a number of people in a room. If there are no people in a room, the HVAC system can be operated in an away mode to save energy. In one embodiment, the average temperatures of detected persons are used to set a temperature target of the HVAC system.

The herein described methods of measuring people flow through the doorway improves upon the functioning of the processor 122 of the computing device 120 and/or the microcontroller 116 of the IR array 110 by enable it/them to accurately detect entry and exit events of people moving through a doorway using low-cost and low-resolution IR sensor arrays. Additionally, the methods are performable in real-time, are privacy preserving, and have fewer deployment constraints compared to conventional solutions. Particularly, the placement and orientation of the IR array 100 is not as constrained as conventional break-beam sensor based solutions. Additionally, the methods have almost no privacy concerns because the resolution is so low and human body temperature is so similar that it is almost impossible to uniquely identify occupants. The methods advantageously deal with realistic and dynamic changes in the sensing environment by leveraging a combination of Otsu's thresholding and modeling thermal noise distribution. Experimental results show an average of 93% accuracy in estimating the number of occupants in rooms. The lightweight, low power, and low cost nature of the sensor system 100, in conjunction with the methods disclosed herein, makes it an affordable solution for large scale deployments, e.g., commercial buildings, academic buildings, hospitals, restaurants, and shopping centers.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of measuring people flow through a doorway, the method comprising:
    reading, with a processor, a sequence of sensor data frames from an infrared array that views the doorway, each sensor data frame having a grid of pixels, each pixel having a temperature value;
    determining, with the processor, a background temperature frame as a pixel-wise average of a predetermined number of initial sensor data frames from the sequence of sensor data frames, the predetermined number of initial sensor data frames including at least two initial sensor data frames;
    determining, with the processor, for each sensor data frame in the sequence of sensor data frames after the predetermined number of initial sensor data frames, whether each respective sensor data frame includes at least one person using at least one filtering technique that identifies sensor data frames that do not include at least one person, the determining whether each respective sensor data frame includes at least one person including (i) calculating deviations of the values of the pixels in the respective sensor data frame from values of corresponding pixels in the background temperature frame, (ii) determining a distribution of the deviations, (iii) identifying a largest local maximum and a second largest local maximum in the distribution, and (iv) determining that the respective sensor data frame does not include at least one person in response to the second largest local maximum having an amplitude that is less than a predetermined percentage of an amplitude the largest local maximum;
    identifying, with the processor, for each sensor data frame in the sequence of sensor data frames that includes at least one person, at least one group of adjacent pixels in the respective sensor data frame corresponding to the at least one person;
    determining, with the processor, for each sensor data frame in the sequence of sensor data frames that includes at least one person, at least one location in the respective sensor data frame corresponding to the at least one person; and
    determining, with the processor, for each sensor data frame in the sequence of sensor data frames determined that includes at least one person, whether the at least one person in the respective sensor data frame is a same person as a person in a previous sensor data frame in the sequence of sensor data frames.

2. The method of claim 1 further comprising:
    increasing, with the processor, a resolution of sensor data frames in the sequence of sensor data frames using linear interpolation.

3. The method of claim 1, the determining whether each respective sensor data frame includes at least one person further comprising:
    classifying each pixel in the respective sensor data frame as one of (i) a first class and (ii) a second class based on a comparison with a first threshold, pixels having a value greater than the first threshold being classified as the first class and pixels having a value less than the first threshold being classified as the second class;
    determining a first average value of the pixels classified as the first class and a second average value of the pixels classified as the second class; and
    determining that the respective sensor data frame does not include at least one person in response to the first average value not exceeding the second average value by at least a second threshold.

4. The method of claim 3, the classifying each pixel in the respective sensor data frame further comprising:
    defining the first threshold using Otsu's method.

5. The method of claim 1, the determining whether each respective sensor data frame includes at least one person further comprising:
    determining a first average value of all pixels in the respective sensor data frame;
    determining a second average value of all pixels in the background temperature frame; and
    determining that the respective sensor data frame does not include at least one person in response to the first average value not exceeding the second average value by at least a second threshold.

6. The method of claim 1, the identifying at least one group of adjacent pixels in each respective sensor data frame corresponding to the at least one person further comprising:

comparing each pixel in the respective sensor data frame with a first threshold, in each case the first threshold being equal to a value of a corresponding pixel in the background temperature frame plus a predetermined temperature;

generating an intermediate data frame based on the comparison, pixels of the intermediate data frame being set to a first value in response to corresponding pixels in the respective sensor data frame having a value greater than the corresponding first threshold and set to a second value in response to corresponding pixels in the respective sensor data frame having a value less than the corresponding first threshold;

identifying at least one group of adjacent pixels in the intermediate data frame having the first value; and in response to the at least one group of adjacent pixels in the intermediate data frame having a size less than a first predetermined percentage of a total size of the intermediate data frame, identifying the at least one group of adjacent pixels in the respective sensor data frame as pixels in the respective sensor data frame corresponding to the at least one group of adjacent pixels in the intermediate data frame.

7. The method of claim 6 further comprising, in response to the at least one group of adjacent pixels in the intermediate data frame having a size greater than the first predetermined percentage of the total size of the intermediate data frame:

repeating the comparing, generating, and identifying with incrementally larger values for the predetermined temperature in each repetition until one of:

at least two groups of adjacent pixels are identified in the intermediate data frame having sizes greater than a second predetermined percentage of the total size of the intermediate data frame, the second predetermined percentage being less than the first predetermined percentage; and only one group of adjacent pixels is identified in the intermediate data frame having a size less than the second predetermined percentage of the total size of the intermediate data frame; and identifying the at least one group of adjacent pixels in the respective sensor data frame as pixels in the respective sensor data frame corresponding to one of (i) the at least two groups of adjacent pixels and (ii) the only one group of adjacent pixels in the intermediate data frame.

8. The method of claim 1, the determining at least one location in each respective sensor data frame corresponding to the at least one person further comprising:

determining sums of values of pixels in one of (i) each column and (ii) each row in the respective sensor data frame;

determining at least one maximum of the sums; and determining the at least one location as one of (i) at least one column and (ii) at least one row in the respective sensor data frame corresponding the at least one maximum.

9. The method of claim 8, wherein:

if the at least one person includes only one person, then the at least one maximum is an absolute maximum of the sums; and if the at least one person includes at least two people, then the at least one maximum includes at least two largest local maximums of the sums.

10. The method of claim 1, the determining whether the at least one person in each respective sensor data frame is a same person as a person in a previous sensor data frame in the sequence of sensor data frames further comprising:

determining at least one first difference between the at least one location of the at least one person in the respective sensor data frame and a location of the person in the previous sensor data frame; and determining that the at least one person in the respective sensor data frame is not the same person as the person in the previous sensor data frame in response to the at least one first difference being greater than a first predetermined threshold.

11. The method of claim 10 further comprising, in response to the at least one first difference being less than the first predetermined threshold:

determining at least one first average value of pixels in the at least one group of pixels corresponding to the at least one person in the respective sensor data frame;

determining a second average value of pixels in a group of pixels corresponding to the person in the previous sensor data frame;

determining at least one second difference between the at least one first average value and the second average value;

determining that the at least one person in the respective sensor data frame is the same person as the person in the previous sensor data frame in response to the at least one second difference being less than a second predetermined threshold; and determining that the at least one person in the respective sensor data frame is not the same person as the person in the previous sensor data frame in response to the at least one second difference being greater than the second predetermined threshold.

12. The method of claim 1, wherein the previous sensor data frame is within a predetermined number of frames from the respective sensor data frame in the sequence of sensor data frames.

13. The method of claim 1 further comprising:

determining, with the processor, for each sensor data frame in the sequence of sensor data frames that includes at least one person, at least one direction of movement of the at least one person based on a comparison of the at least one location of the at least one person with at least one location of at least one same person in the previous sensor data frame.

14. The method of claim 1 further comprising:

detecting, with the processor, one of an entry event and an exit event of a person through the doorway based on a comparison of people in at least two sensor data frames in in the sequence of sensor data frames.

15. The method of claim 14, the detecting the one of the entry event and the exit event further comprising:

detecting the one of the entry event and the exit event in response to a first person being identified in a first sensor data frame of the sequence of sensor data frames but not being identified in a second sensor first sensor data frame of the sequence of sensor data that is subsequent to the first sensor data frame.

16. The method of claim 15, the detecting the at least one of the entry event and the exit event further comprising:

detecting the one of the entry event and the exit event depending on a direction of movement of the first person.

17. The method of claim 14 further comprising:

transmitting, with a transceiver, a signal regarding the one of the entry event and the exit event to at least one external device.

18. The method of claim 17, wherein the at least one external device is configured to operate an HVAC system based the signal regarding the one of the entry event and the exit event.

19. A sensor system for measuring people flow through a doorway, the sensor system comprising:
an infrared array having a plurality of infrared sensors arranged in as a grid and oriented to view the doorway; and
a processor operably connected to the infrared array, the processor being configured to:
read a sequence of sensor data frames from the infrared array, each sensor data frame having a grid of pixels, each pixel having a temperature value;
determine a background temperature frame as a pixel-wise average of a predetermined number of initial sensor data frames from the sequence of sensor data frames, the predetermined number of initial sensor data frames including at least two initial sensor data frames;
determine, for each sensor data frame in the sequence of sensor data frames after the predetermined number of initial sensor data frames, whether each respective sensor data frame includes at least one person using at least one filtering technique that identifies sensor data frames that do not include at least one person;
identify, for each sensor data frame in the sequence of sensor data frames that includes at least one person, at least one group of adjacent pixels in the respective sensor data frame corresponding to the at least one person by (i) comparing each pixel in the respective sensor data frame with a first threshold, in each case the first threshold being equal to a value of a corresponding pixel in the background temperature frame plus a predetermined temperature, (ii) generating an intermediate data frame based on the comparison, pixels of the intermediate data frame being set to a first value in response to corresponding pixels in the respective sensor data frame having a value greater than the corresponding first threshold and set to a second value in response to corresponding pixels in the respective sensor data frame having a value less than the corresponding first threshold, (iii) identifying at least one group of adjacent pixels in the intermediate data frame having the first value, and (iv) in response to the at least one group of adjacent pixels in the intermediate data frame having a size less than a first predetermined percentage of a total size of the intermediate data frame, identifying the at least one group of adjacent pixels in the respective sensor data frame as pixels in the respective sensor data frame corresponding to the at least one group of adjacent pixels in the intermediate data frame;
determine, for each sensor data frame in the sequence of sensor data frames that includes at least one person, at least one location in the respective sensor data frame corresponding to the at least one person; and
determine, for each sensor data frame in the sequence of sensor data frames determined that includes at least one person, whether the at least one person in the respective sensor data frame is a same person as a person in a previous sensor data frame in the sequence of sensor data frames.

20. A method of measuring people flow through a doorway, the method comprising:
reading, with a processor, a sequence of sensor data frames from an infrared array that views the doorway, each sensor data frame having a grid of pixels, each pixel having a temperature value;
determining, with the processor, a background temperature frame as a pixel-wise average of a predetermined number of initial sensor data frames from the sequence of sensor data frames, the predetermined number of initial sensor data frames including at least two initial sensor data frames;
determining, with the processor, for each sensor data frame in the sequence of sensor data frames after the predetermined number of initial sensor data frames, whether each respective sensor data frame includes at least one person using at least one filtering technique that identifies sensor data frames that do not include at least one person;
identifying, with the processor, for each sensor data frame in the sequence of sensor data frames that includes at least one person, at least one group of adjacent pixels in the respective sensor data frame corresponding to the at least one person;
determining, with the processor, for each sensor data frame in the sequence of sensor data frames that includes at least one person, at least one location in the respective sensor data frame corresponding to the at least one person; and
determining, with the processor, for each sensor data frame in the sequence of sensor data frames determined that includes at least one person, whether the at least one person in the respective sensor data frame is a same person as a person in a previous sensor data frame in the sequence of sensor data frames,
wherein at least one of:
the determining at least one location in each respective sensor data frame corresponding to the at least one person further comprises (i) determining sums of values of pixels in one of each column and each row in the respective sensor data frame, (ii) determining at least one maximum of the sums, and (iii) determining the at least one location as one of at least one column and at least one row in the respective sensor data frame corresponding the at least one maximum, wherein if the at least one person includes only one person, then the at least one maximum is an absolute maximum of the sums, wherein if the at least one person includes at least two people, then the at least one maximum includes at least two largest local maximums of the sums; and
the determining whether the at least one person in each respective sensor data frame is a same person as a person in a previous sensor data frame in the sequence of sensor data frames further comprises (I) determining at least one first difference between the at least one location of the at least one person in the respective sensor data frame and a location of the person in the previous sensor data frame, (II) determining that the at least one person in the respective sensor data frame is not the same person as the person in the previous sensor data frame in response to the at least one first difference being greater than a first predetermined threshold, and (III) in response to the at least one first difference being less than the first predetermined threshold: determining at least one first average value of pixels in the at least one group of pixels corresponding to the at least one person in the respective sensor data frame, determining a second average value of pixels in a group of pixels corresponding to the person in the previous sensor data frame, determining at least one second difference between the at least one first average value and the second average value, determining that the at least one person in the respective sensor data frame is the same person as the person in the previous sensor data frame in response to the at least one second difference being less than a second predetermined threshold, and determining that the at least one person in the respective sensor data frame is not the same person as the person in the previous sensor data frame in response to the at least one second difference being greater than the second predetermined threshold.

* * * * *